United States Patent
Pereira Silveira et al.

(10) Patent No.: US 10,970,058 B2
(45) Date of Patent: Apr. 6, 2021

(54) SOFTWARE PACKAGE INSTALLATIONS WITH PROXIMITY TAGS

(71) Applicant: HEWLETT-PACKARD DEVELOPMENT COMPANY, L.P., Spring, TX (US)

(72) Inventors: Roberto Pereira Silveira, Porto Alegre (BR); Jose Dirceu Grundler Ramos, Porto Alegre (BR); Charles Ricardo Staub, Porto Alegre (BR); Juliano Francisco Cagnini Ciocari, Porto Alegre (BR); Kimon Berlin, Fort Collins, CO (US); Anellena Santos, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 74 days.

(21) Appl. No.: 16/075,897

(22) PCT Filed: Jan. 18, 2017

(86) PCT No.: PCT/US2017/013863
§ 371 (c)(1),
(2) Date: Aug. 6, 2018

(87) PCT Pub. No.: WO2018/136041
PCT Pub. Date: Jul. 26, 2018

(65) Prior Publication Data
US 2019/0065167 A1 Feb. 28, 2019

(51) Int. Cl.
*G06F 8/61* (2018.01)
*G06F 21/44* (2013.01)
(Continued)

(52) U.S. Cl.
CPC .............. *G06F 8/61* (2013.01); *G06F 9/4406* (2013.01); *G06F 21/44* (2013.01); *G06F 21/575* (2013.01); *H04L 67/34* (2013.01)

(58) Field of Classification Search
None
See application file for complete search history.

(56) References Cited

U.S. PATENT DOCUMENTS 7,330,118 B2 * 2/2008 Durham ................ G06F 21/575
340/10.1
7,558,958 B2 7/2009 Lieberman et al.
(Continued)

FOREIGN PATENT DOCUMENTS

| KR | 20140009684 A | 1/2014 | |
| WO | 2007142821 A2 | 12/2007 | |
| WO | WO-2013147915 A1 * | 10/2013 | ........... G06F 9/4401 |

OTHER PUBLICATIONS

AMD, "AMD RS880 ASIC Family BIOS Developer Guide", 2010, AMD (Year: 2010).*

(Continued)

*Primary Examiner* — Hossain M Morshed
(74) *Attorney, Agent, or Firm* — Fabian VanCott (57) ABSTRACT

A method of installing a software package may include storing a software package coupon on a proximity tag coupled to a computing device; accessing the software package coupon and installing an operating system OS agent during an initial booting of the computing device; and with the OS agent, downloading and installing the software package.

16 Claims, 4 Drawing Sheets

(51) Int. Cl.
  *G06F 21/57* (2013.01)
  *G06F 9/4401* (2018.01)
  *H04L 29/08* (2006.01)

(56) References Cited

U.S. PATENT DOCUMENTS

| | | | |
|---|---|---|---|
| 7,797,525 B2 | 9/2010 | Lee et al. | |
| 7,856,451 B2* | 12/2010 | Shapiro | G06F 16/13 |
| | | | 707/791 |
| 8,156,567 B2 | 4/2012 | Shin et al. | |
| 8,250,377 B2 | 8/2012 | Png et al. | |
| 8,499,141 B2* | 7/2013 | Swanson | H04W 4/80 |
| | | | 713/1 |
| 8,661,406 B2* | 2/2014 | Shapiro | G06F 8/30 |
| | | | 717/106 |
| 9,311,107 B2 | 4/2016 | Hall et al. | |
| 9,501,289 B2* | 11/2016 | Chen | G06F 9/4403 |
| 2005/0256973 A1* | 11/2005 | Holtz | H04L 41/12 |
| | | | 709/245 |
| 2007/0143162 A1* | 6/2007 | Keever | G06F 8/34 |
| | | | 705/28 |
| 2007/0277029 A1* | 11/2007 | Rao | G06F 8/61 |
| | | | 713/2 |
| 2008/0041930 A1* | 2/2008 | Smith | G06F 9/44505 |
| | | | 235/375 |
| 2008/0163345 A1* | 7/2008 | Bauman | H04L 63/0492 |
| | | | 726/5 |
| 2009/0077674 A1* | 3/2009 | Shin | G06F 8/61 |
| | | | 726/31 |
| 2010/0229000 A1* | 9/2010 | Png | G06F 21/10 |
| | | | 713/190 |
| 2010/0293263 A1* | 11/2010 | Caire | H04L 67/12 |
| | | | 709/223 |
| 2011/0099547 A1* | 4/2011 | Banga | G06F 8/61 |
| | | | 717/176 |
| 2011/0156880 A1* | 6/2011 | Rygaard | G06F 9/454 |
| | | | 340/10.1 |
| 2011/0258410 A1* | 10/2011 | Lambert | G06F 21/575 |
| | | | 711/164 |
| 2012/0059805 A1 | 3/2012 | Bhogal et al. | |
| 2012/0303762 A1 | 11/2012 | Geiser | |
| 2013/0193206 A1* | 8/2013 | Berger | A61B 6/4494 |
| | | | 235/380 |
| 2014/0110613 A1* | 4/2014 | Pitchford | F16K 31/088 |
| | | | 251/129.01 |
| 2017/0286084 A1* | 10/2017 | Debates | H04L 67/34 |
| 2018/0165101 A1* | 6/2018 | Bulusu | G06F 11/1417 |
| 2019/0065167 A1* | 2/2019 | Silveira | G06F 8/61 |

OTHER PUBLICATIONS

ManageEngine, "Desktop Central", 2015, https://www.manageengine.com/products/desktop-central/windows-registry-settings.html (Year: 2015).*

Cruz, Integration of PXE-based Desktop Solutions into Broadband Access Networks, 2010, IEEE (Year: 2010).*

Daly et al., "Base Operating System Provisioning and Bringup for a Commercial Supercomputer", IEEE, Retrieved from internet—http://people.seas.harvard.edu/~apw/papers/Daly07.pdf, 2007, 7 Pages.

\* cited by examiner

SOFTWARE PACKAGE INSTALLATIONS WITH PROXIMITY TAGS

BACKGROUND

Software installation on a computing device has increasingly become relatively easier for an end user or information technology specialist to complete. When a software package is installed on a computing device, customization of various software packages may also be completed. Where this occurs on a relatively high number of computing devices, a 'master' selected software package is customized, tested, and placed on the number of computing devices. Where this occurs on a relatively low number of computing devices, the selected software package is manually customized for each of the computing devices.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

As described above, the customization of software packages may be accomplished a number of ways depending on the number of computing devices the software package is to be installed on. When either customizing a "master" software package for a relatively high number of computing devices or customizing each software package for a relatively low number of computing devices, time and money is spent on this customization process. Indeed, in some cases where each individual software package to be installed on the computing device is to be customized according to as many individual users, manual customization and even customization of a master software package may not be an available option.

At a storefront, a purchaser of a computing device may not have an opportunity to customize any software included or installed with the computing device. Indeed, after purchase of a computing device at a storefront, in order to customize any software packages in the computing device, a user is left to personally install various additional packages by interfacing with a physical copy of a software customization package or gain access to that same software customization package via a network connection.

The present specification, therefore describes a method of installing a software package including storing a software package coupon on a proximity tag coupled to a computing device; accessing the software package coupon and installing an operating system OS agent during, for example, a pre-boot environment execution UEFI of the computing device; and with the OS agent, downloading and installing the software package during booting of an operating system of the computing device. In an example and in the case of using a passive proximity tag, the computing device may be turned off and even boxed as the proximity tag has the software package coupon stored thereon.

The present specification further describes a computing device including a proximity tag and a proximity tag coupon manager PTCM wherein, prior to booting of an operating system OS on the computing device, the PTCM is to read a software package coupon stored on the proximity tag, install an OS agent based on data associated with the software package coupon, and cause the OS agent to be called during booting of the OS for installation of a software package on the computing device.

The present specification also describes a proximity tag including a software package coupon including an address to a source to download an operating system OS agent and a product key to install a software package during an initial booting of an operating system of a computing device.

As used in the present specification and in the appended claims, the term "proximity tag" is meant to be understood as any device that may wirelessly communicate with a proximity tag writer device, store the data written by the device in a non-volatile media, and allow this data to be read by the main processor of the computing device through a communication channel.

Further, as used in the present specification and in the appended claims, the term "software package" is meant to be understood as any computer readable program code that can augment other computer readable program code or alter other computer readable program code.

Even still further, as used in the present specification and in the appended claims, the term "a number of" or similar language is meant to be understood broadly as any positive number comprising 1 to infinity.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

Figure 1:
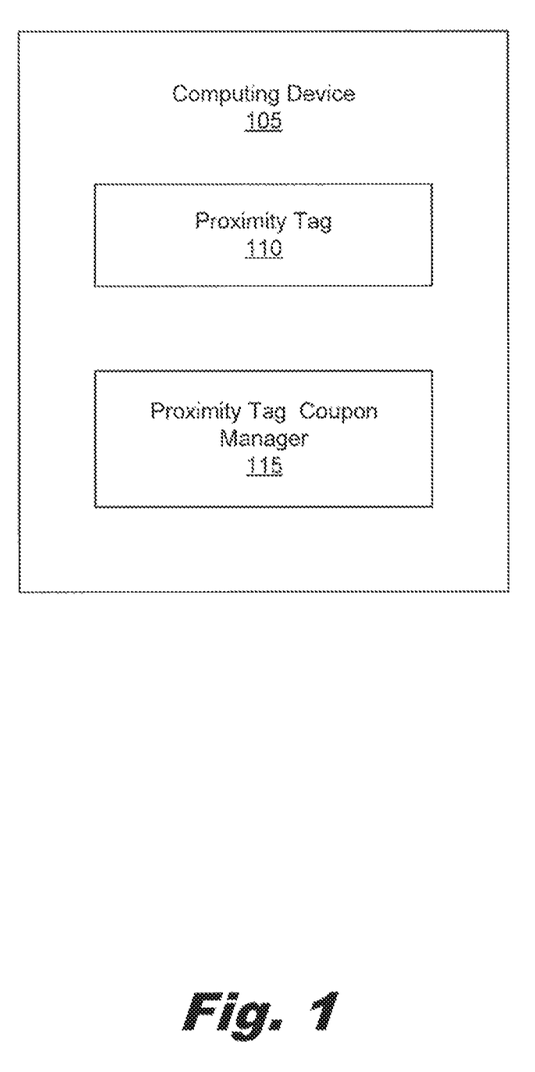
FIG. 1 is a block diagram of a computing device according to an example of the principles described herein.

FIG. 1 is a block diagram of a computing device 105 according to an example of the principles described herein. The computing device 105 may include a proximity tag 110 and a proximity tag coupon manager PTCM 115.

The computing device 105 may be any type of computing device. Examples of computing devices 105 include servers, desktop computers, laptop computers, personal digital assistants (PDAs), mobile devices, smartphones, gaming systems, and tablets, among other electronic devices.

The computing device 105 may be utilized in any data processing scenario including, stand-alone hardware, mobile applications, through a computing network, or combinations thereof. Further, the computing device 105 may be used in a computing network, a public cloud network, a private cloud network, a hybrid cloud network, other forms of networks, or combinations thereof. In one example, the methods provided by the computing device 105 are provided as a service over a network by, for example, a third party. In this example, the service may include, for example, the following: a Software as a Service SaaS hosting a number of applications; a Platform as a Service PaaS hosting a computing platform comprising, for example, operating systems, hardware, and storage, among others; an Infrastructure as a Service IaaS hosting equipment such as, for example, servers, storage components, network, and components, among others; application program interface API as a service API-aaS, other forms of network services, or combinations thereof. The present systems and methods may be implemented on one or multiple hardware platforms, in which the modules in the system can be executed on one or across multiple platforms. Such modules can run on various forms of cloud technologies and hybrid cloud technologies or offered as a SaaS Software as a service that can be implemented on or off the cloud. In another example, the methods provided by the computing device 105 are executed by a local administrator.

To achieve its desired functionality, the computing device 105 includes various hardware components. Among these hardware components may be a number of processors, a number of data storage devices, a number of peripheral device adapters, and a number of network adapters. These hardware components may be interconnected through the use of a number of busses and/or network connections. In one example, the processor, data storage device, peripheral device adapters, and a network adapter may be communicatively coupled via a bus.

The processor may include the hardware architecture to retrieve executable code from the data storage device and execute the executable code. The executable code may, when executed by the processor, cause the processor to implement at least the functionality of customizing a software package on the computing device 105, according to the methods of the present specification described herein. In the course of executing code, the processor may receive input from and provide output to a number of the remaining hardware units.

The data storage device may store data such as executable program code that is executed by the processor or other processing device. As discussed below, the data storage device may specifically store computer code representing a number of applications that the processor executes to implement at least the functionality described herein.

The data storage device may include various types of memory modules, including volatile and nonvolatile memory. For example, the data storage device of the present example includes Random Access Memory RAM, Read Only Memory ROM, and Hard Disk Drive HDD memory. Many other types of memory may also be utilized, and the present specification contemplates the use of many varying types of memory in the data storage device as may suit a particular application of the principles described herein. In certain examples, different types of memory in the data storage device may be used for different data storage needs. For example, in certain examples the processor may boot from Read Only Memory ROM, maintain nonvolatile storage in the Hard Disk Drive HDD memory, and execute program code stored in Random Access Memory RAM.

Generally, the data storage device may include a computer readable medium, a computer readable storage medium, or a non-transitory computer readable medium, among others. For example, the data storage device may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random-access memory RAM, a read-only memory ROM, an erasable programmable read-only memory EPROM or Flash memory, a portable compact disc read-only memory CD-ROM, an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The hardware adapters in the computing device 105 enable the processor to interface with various other hardware elements, external and internal to the computing device 105. For example, the peripheral device adapters may provide an interface to input/output devices, such as, for example, display device, a mouse, or a keyboard. The peripheral device adapters may also provide access to other external devices such as an external storage device, a number of network devices such as, for example, servers, switches, and routers, client devices, other types of computing devices, and combinations thereof.

The display device may be provided to allow a user of the computing device 105 to interact with and implement the functionality of the computing device 105. The peripheral device adapters may also create an interface between the processor and the display device, a printer, or other media output devices. The network adapter may provide an interface to other computing devices within, for example, a network, thereby enabling the transmission of data between the computing device 105 and other devices located within the network.

The computing device 105 may, when executed by the processor, display the number of graphical user interfaces GUIs on the display device associated with the executable program code representing the number of applications stored on the data storage device. The GUIs may display, for example, pop-up windows or other windows that allow interaction with a user to customize a software package on the computing device 105. Examples of display devices include a computer screen, a laptop screen, a mobile device screen, a personal digital assistant PDA screen, and a tablet screen, among other display devices. Examples of the GUIs displayed on the display device, are described in more detail below.

The computing device 105 may further include an operating system. Such operating systems may include, for example, WINDOWS® operating system developed and distributed by Microsoft Corporation; UBUNTU® operating system developed and distributed by Canonical Ltd.; UNIX® operating system developed by American Telephone and Telegraph Company and distributed as an open source software package; LINUX® Unix-based operating system developed and distributed as an open source software package; ANDROID® Linux-based operating system developed and distributed by Google, Inc.; BERKELEY SOFTWARE DISTRIBUTION BSD Unix-based operating system developed and distributed by the Computer Systems Research Group CSRG of the University of California, Berkeley; iOS® operating system developed and distributed by Apple Inc.; Mac OS X operating system developed and distributed by Apple Inc. As described above, the operating system or software packages running on the computing device 105 with the operating system may be customized as described herein.

The computing device 105 further includes a proximity tag 110. The proximity tag 110 may be coupled at any location associated with the computing device 105. In an example, the proximity tag 110 may be coupled to a housing of the computing device 105 accessible or not accessible to a user of the computing device 105. In an example, the proximity tag 110 may be coupled to a packaging associated with the computing device 105. As described below, the proximity tag 110 may be close enough to a proximity tag reader communicatively coupled to the computing device 105 such that a proximity tag reader may communicate with the proximity tag 110.

The proximity tag 110 may be any type of device that may wirelessly communicate with a proximity tag writer used to program a software package coupon thereon and a proximity tag reader located within the computing device 105. In an example, the proximity tag 110 is a near-field communication NFC tag that enables each of the proximity tag writer and reader to establish communication when the NFC tag is within a predetermined distance. In an example, the proximity tag 110 is a radio-frequency identification RFID tag that implements an electromagnetic field in order to write data to and read data from the proximity tag 110. Other examples of proximity wireless communication devices may also exist and the present specification contemplates the use of those types of devices to at least read a software package coupon stored on the proximity tag 110.

The proximity tag 110 may include its own data storage device. The data storage device of the proximity tag 110 may be any non-volatile storage device that, when powered, may be written to and read from. As mentioned above, the software package coupon 120 including the product key 130 may be stored on the data storage device of the proximity tag 110. This is described in more detail below.

In an example, the proximity tag 110 is a passive proximity tag 110. A passive proximity tag 110 may be electrically activated using an energy source apart from the passive proximity tag 110. In this example, data may be written to or read from the passive proximity tag 110 when the passive proximity tag 110 is electrically activated by the energy source. Additionally, in this example, wireless communication may be initiated between a proximity tag reader and/or writer when the passive proximity tag 110 is electrically activated by the energy source. In an example, the proximity tag 110 is an active proximity tag 110. In this example, the active proximity tag 110 includes a local power source such as a battery. In this example, the active proximity tag 110 may be communicatively coupled to a proximity tag reader and/or writer when a signal from the proximity tag reader and/or writer sends a signal to the active proximity tag 110 requesting that communication be established.

As described above, the proximity tag 110 may be small enough to fit within a housing of the computing device 105. In an example, the proximity tag 110 is housed within the housing of the computing device 105 in order to prevent tampering of the proximity tag 110 by a user. In an example, however, the proximity tag 110 may be placed anywhere, including outside of the housing of the computing device 105 so long as a proximity tag reader within the housing of the computing device 105 can establish communication with the proximity tag 110.

The computing device 105 may further include a proximity tag coupon manager PTCM 115. In an example, the PTCM 115 may be a module that includes executable program code that may be executed by the processor of the computing device 105. In this example, the program code that defines the PTCM 115 may be provided separately from other executable program code stored in memory associated with a basic input/output system BIOS program code or operating system OS program code. In an example, the PTCM 115 may be an application specific integrated circuit ASIC that, when directed by the processor of the computing device 105, executes the functionality described herein. In an example, the PTCM 115 is a software application residing on the BIOS of the computing device and executed by the processor of the computing device.

Specifically, the PTCM (115) may initiate a coupon manager procedure where the PTCM (115) accesses a software package coupon stored on the proximity tag 110 by a proximity tag writer. In an example, the PTCM 115 accesses the software package coupon by initiating a communication channel between the proximity tag and a processor associated with the computing device and reads the software package coupon on the proximity tag. As described herein, the PTCM 115 may be executed upon execution of a BIOS of the computing device 105. Upon execution of the PTCM 115, the PTCM 115 retrieves the software package coupon that includes, among others, an address to an operating system OS agent and a product key or other certification to download the software package associated with the product key and/or OS agent.

Figure 2:
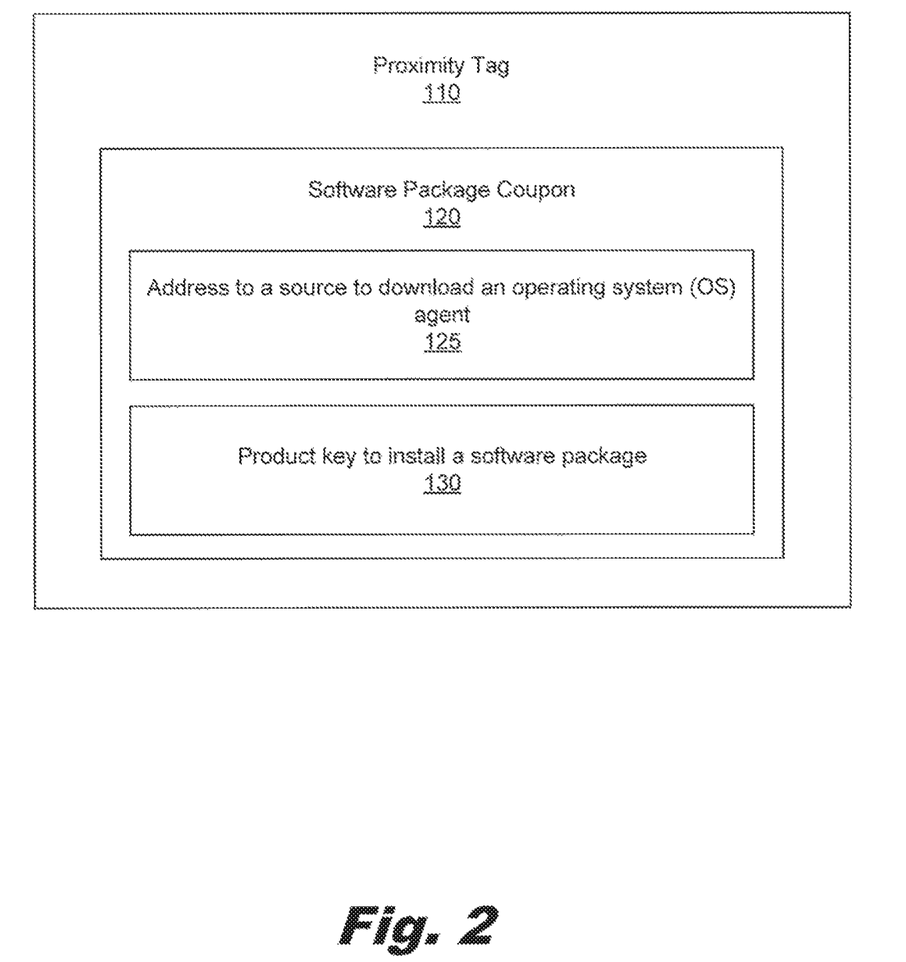
FIG. 2 is a block diagram of a proximity tag according to an example of the principles described herein.

FIG. 2 is a block diagram of a proximity tag 110 according to an example of the principles described herein. The proximity tag 110 may include a software package coupon 120. The software package coupon 120 may include an address 125 to a source to download an OS agent and a product key 130 to install a software package during, for example, an initial booting of an OS of a computing device 105.

As described above, the address 125 may be any indicator that directs the BIOS via the PTCM 115 to a source where the OS agent may be downloaded and installed. In an example, the address 125 may be a uniform resource locator URL that directs the BIOS to download the OS agent over a network connection. In this example, the BIOS may download the OS agent using the unified extensible firmware interface UEFI network stack. In an example, the address 125 is an address to a portion of memory located on the data storage device of the computing device 105.

The downloaded OS agent and product key may be stored on a data storage device of the computing device 105. After the downloaded OS agent is saved to the data storage device, the PTCM 115 may configure the OS on the computing device 105 to call the OS agent once the OS is booted. In an example, this may be done by adjusting registry keys in the OS, or using any other method adequate to the specific OS, such that the OS agent is executed at least before the OS is completely booted. As the OS boots, the OS agent may be run as part of the of the computing device's 105 startup process. Accordingly, the OS agent, with the address 125, accesses the source of the software package and downloads the software package. In an example, the product key 130 may be used as verification that the computing device is authorized to download and/or install the software package.

Once downloaded, the OS agent may have a software packaged installer executed. This allows for the installation of the software package onto the data storage device of the computing device 105. In an example, at any time after booting of the OS, a user may either accept the download and/or installation of the software package via a number of GUIs provided to the user via a visual output device such as a screen. In an example, the download and installation is automatically completed without further interaction from the user.

Additionally, the PTCM 115 may download any number of OS agents associated with any number of software packages based on any number of software package coupons 120 stored on the proximity tag 110 and accessed by the PTCM 115. In an example, a purchaser of the computing device 105 may request from a sales person that these additional software package coupons 120 be written to the proximity tag 110 at the time of purchase. The sales person may then use a proximity tag writer to write to the proximity tag 110 any number of addresses 125 to downloadable OS agents associated with any number of software packages and any associated product keys 130.

The software packages downloadable by the OS agents may be any type of software package that is a customization package of an existing application installed on the computing device 105 or a standalone application yet to be installed on the computing device 105. Additionally, third-party developers may request that, as a promotional campaign for example, their software package coupons 120 be written to the proximity tag 110 at the point of sale. In this example, the third-party software package may be downloaded as described above and the user may use, for example, a promotional version of the software package to entice the user to purchase a complete or continued version of the third-party software package.

Figure 3:
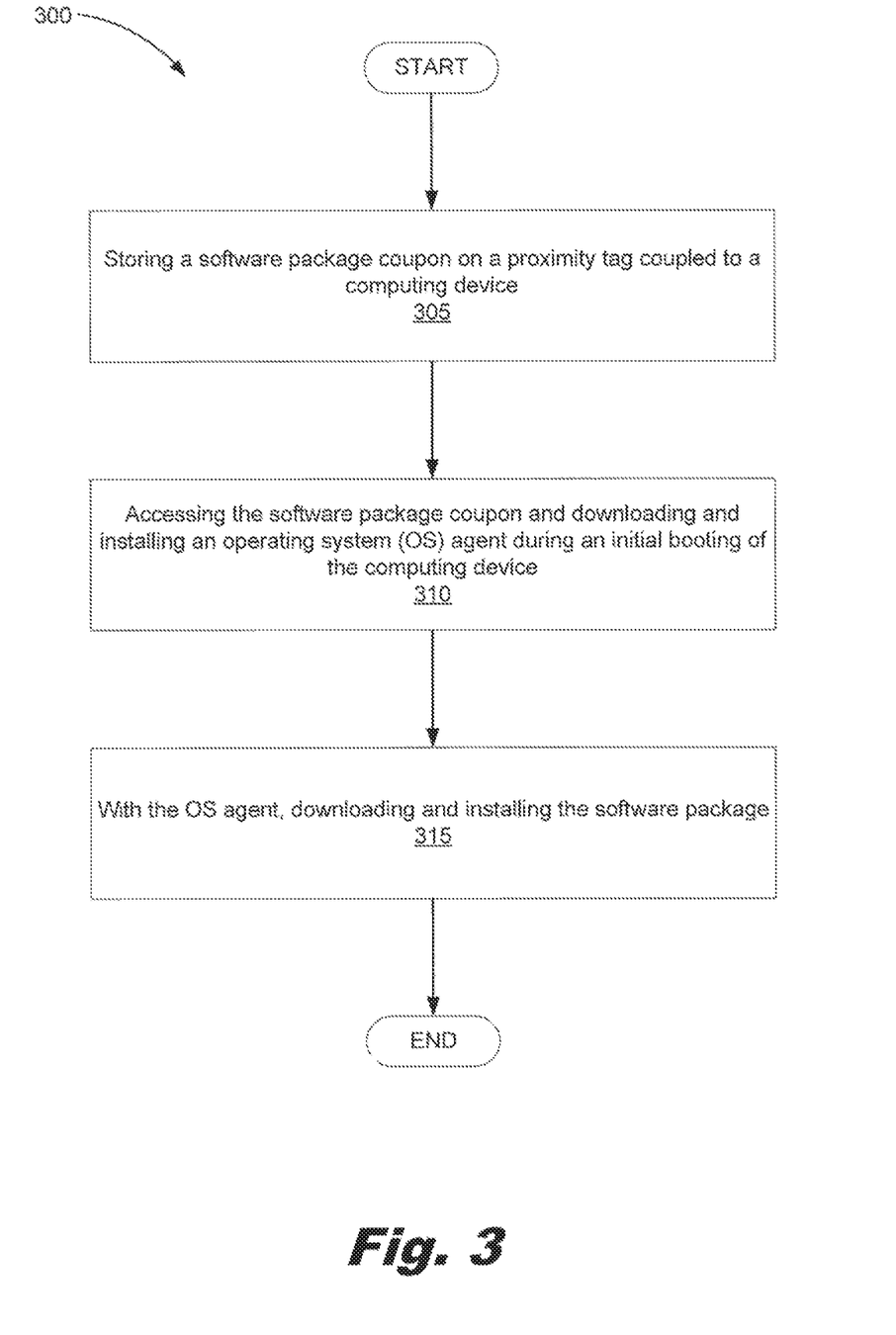
FIG. 3 is a flowchart showing a method of installing a software package according to an example of the principles described herein.

FIG. 3 is a flowchart showing a method of installing a software package according to an example of the principles described herein. In this example, the method 300 may include storing a software package coupon on a proximity tag 110 coupled to a computing device 105, at 305. As mentioned above, this may be done through the use of a proximity tag writing device that may establish a wireless communication with the proximity tag 110 and write data to a storage device located on the proximity tag 110. At a point of sale, for example, of the computing device 105, a purchaser may request from the sales person that certain software packages or customization software packages be included with the purchased or to be purchased computing device 105. Upon request, the sales person may cause any number of software package coupons 120 to be written to the storage device on the proximity tag 110. Although the present describes the programming of the data storage device of the proximity tag 110 by a point of sale representative, other scenarios or situations may allow for any person to program the proximity tag 110 with at least the software package coupon 120 as described herein. Consequently, the present example is not meant to limit the present disclosure but instead merely provided as an example.

The method 300 may continue with accessing the software package coupon 120 and downloading and installing an operating system OS agent during an initial booting of the computing device 105, at 310. In connection with the example provided above, after a point-of-sale purchase a user may boot up the computing device 105 in an initial use of the computing device 105. During this booting process, the BIOS of the computing device 105 may initiate a proximity tag 110 reading procedure by establishing communication with the proximity tag 110. In an example, this is a wireless communication established between the computing device 105 and the proximity tag 110 such that a proximity tag reader provides the energy to establish the wireless communication with the proximity tag 110. In an example, the communication established with the proximity tag 110 is a wired communication with the proximity tag 110 being in electrical communication via a wire to, for example, the processor of the computing device 105.

Once communication with the proximity tag 110 is established, the PTCM 115 may access an address describing where an OS agent may be downloaded as well as the product key 130 associated with the OS agent and the software package to be downloaded. In an example, the OS agent may be preloaded on a data storage device associated with the computing device 105 and the address is an address to a portion of the data storage device on the computing device 105 where the OS agent may be accessed. In this example, the PTCM 115 may confirm access the OS agent on the data storage device and configure the OS of the computing device 105 to call the OS agent while booting of the OS. This may be done by altering the registry keys of the OS, or using any other method adequate to the specific OS of the computing device 105, such that installation of the OS agent is to occur prior to a complete booting of the OS.

In an example, the PTCM 115 may be provided with a link, such as a URL, from the proximity tag 110. In this example, the BIOS and PTCM 115 may establish a connection to the network on which the OS agent may be downloaded from, download the OS agent from the network, and save the OS agent, along with the product key 130, on a dedicated portion of the data storage device of the computing device 105. The process may continue as above with the PTCM 115 confirming access the OS agent on the data storage device and configuring the OS of the computing device 105 to call the OS agent while booting of the OS. This may be done by altering the registry keys of the OS, or using any other method adequate to the specific OS of the computing device 105, such that installation of the OS agent is to occur prior to a complete booting of the OS.

The method 300 may then continue with downloading and installing the software package during booting of the OS of the computing device 105 via the OS agent, at 315. Because the OS agent was called during the booting process of the OS, the OS agent is then directed to search for the described customization software package or other software package either on the data storage device of the computing device 105 or on the above described network. In an example, the software package may be located on a memory device of the computing device 105 and accessible to the OS agent. In an example, the software package is accessible to the OS agent from a remote repository located over a computer network communicatively coupled to the computing device 105. In either case, the OS agent downloads 315 the software package and proceeds with the installation 315 process of the software package. This may or may not involve user interaction during the installation process. In an example, a user may not be made aware of the installation. In this example, the addition of the product key 130 and software package coupon 120 to the proximity tag 110 may be seen as implicit authorization by the user to install the associated software package. In an example, the user may be allowed to confirm if and how the software package is to be installed. A reboot of the BIOS and OS may or may not be implemented at this time.

In the example, where the software package is located on the memory device of the computing device, the software that is not installed onto the computing device 105 may be deleted from the memory device. In this example, any number of software packages may be available on the memory device and those that were not installed may be deleted. In an example, those software packages that were not installed included those software packages that the user did not pay for and, consequently, did not have a corresponding software package coupon 120 programed onto the proximity tag 110.

Figure 4:
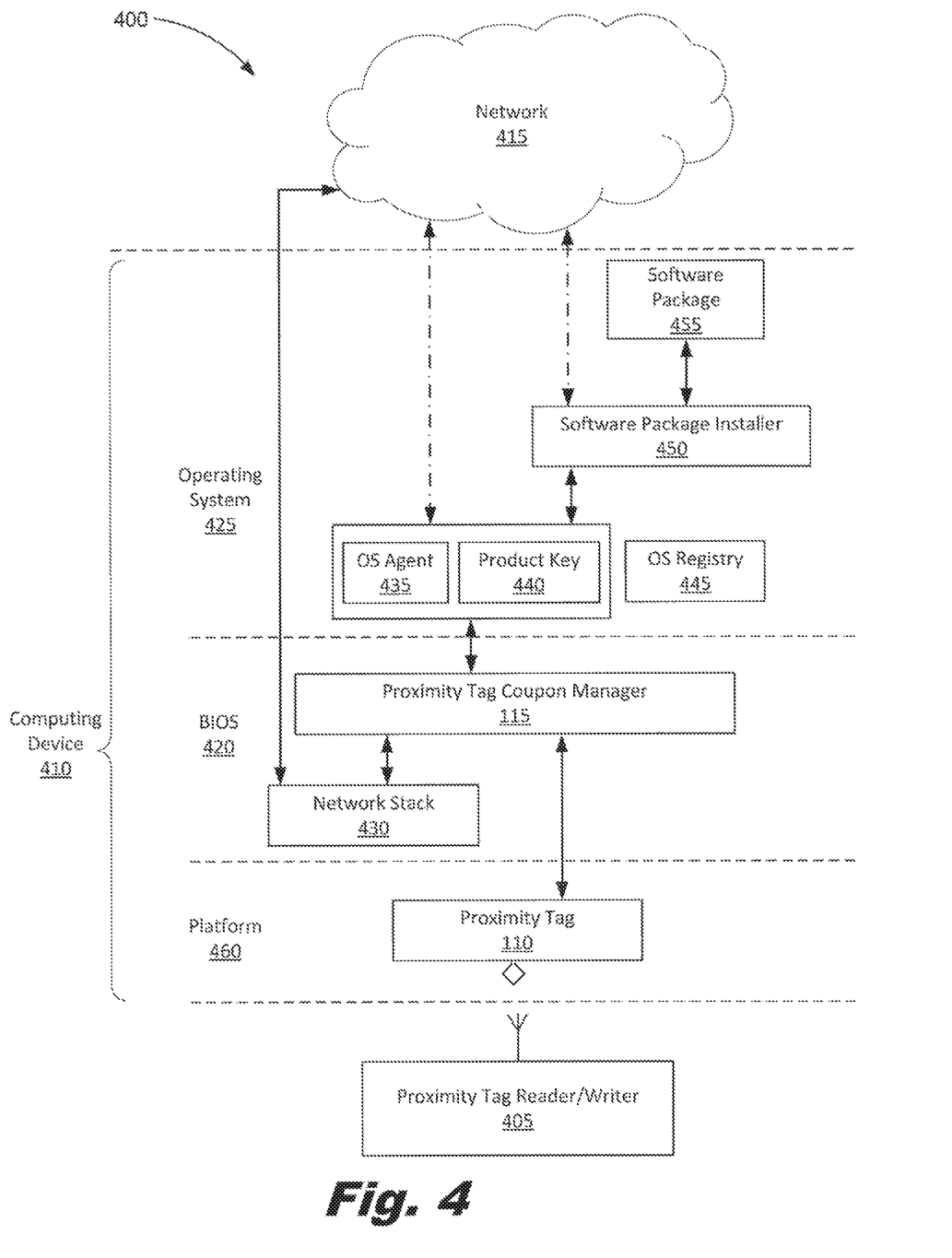
FIG. 4 is a block diagram showing the network topography and data transfer of a system for installing a software package according to an example of the principles described herein.

FIG. 4 is a block diagram showing the network topography and data transfer of a system 400 for installing a software package according to an example of the principles described herein. The system 400 may include a proximity tag reader/writer 405, a computing device 410 including a hardware platform 460 with a proximity tag 110 coupled thereto, and a network 415.

The proximity tag reader/writer 405 may be used to access the proximity tag 110 and write data to the proximity tag 110 as described above. The data may include any type of data that may be used to install a software package on the computing device 410 associated with the proximity tag 110. In an example, the data includes, at least, a product key 130 associated with a customization software package or software package and an address 125 describing a location where an OS agent is to be downloaded or accessed by the computing device 410 and more specifically by a PTCM 115. In an example, the proximity tag reader/writer 405 may also be used to access the data on the proximity tag 110 to confirm proper transfer of the data.

The computing device 410 may include the proximity tag 110 as described above, a BIOS 420, and an operating system 425. The proximity tag 110 may be communicatively coupled, either wirelessly or wired, to a processor of the computing device 410. Having the proximity tag 110 in communication with the processor of the computing device 410 allows for the PTCM 115 described above to access the data from the proximity tag 110 during booting of the BIOS 420.

The BIOS 420 may include the PTCM 115 and a network stack 430. In an example, both the BIOS 420 and the PTCM 115 follow the unified extensible firmware interface UEFI standard. As described herein, the PTCM 115 may be executed by the BIOS 420 to access, through a wired or wireless communication channel the proximity tag 110. The procedure enacted by the PTCM 115 may also retrieve a product key 130 and address 125 to an OS agent 435, download the OS agent 430 to a data storage device of the computing device 105, and store the OS agent 430 on a data storage device of the computing device 105.

After downloading the OS agent 435, the PTCM 115 may cause the OS agent to be installed by configuring, for example, the registry keys 445 of the OS 425 such that the OS 425 calls or executes the OS agent 435 once the OS 425 is booted.

As the OS agent 435 is executed as part of the startup process of the computing device 105, the OS agent 435 downloads the software package associated with the OS agent 435 and software package coupon 120 as described above. Having downloaded the software package, the product key 440 may be used to verify user authenticity to use the software package. Once this has been verified, a software package installer 450 may install the software package 455.

Aspects of the present system and method are described herein with reference to flowchart illustrations and/or block diagrams of methods, apparatus systems and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general-purpose computer, special purpose computer, or other programmable data processing apparatus to produce a machine, such that the computer usable program code, when executed via, for example, the processor of the computing device 105 or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe a method of installing a software package on a computing device using a proximity tag. The method, device, and system described herein implements a proximity tag to install a customization software package or software application generally. The proximity tag may have a software package coupon programed thereon at a point of sale. This allows for a computing device to be customized at a point of sale. Additionally, through the use of a software package coupon, a computing device may be customized with relatively little effort by the user through the use of an OS agent being executed prior to booting of an OS on the computing device. This provides for a method by which a user does not find a source of a software package before installing the software package on the computing device. In some examples, a user may not actually need to make physical contact with the computing device in order to have customization software packages configured to be installed on the computing device. Additionally, through the use of the proximity tag, the computing device does not need to be unboxed and powered up in order to configure the customization of the computing device. Instead, the software package coupon may be written thereto.

Still further, vendors and/or system integrators, for example, could relatively more easily configure computing devices to automatically install specific software packages requested by the customers, without having to unpack the computing devices from their packaging and setup the system manually. This may save time and reduce the cost of manufacture or installation. This may be especially useful when preparing batches of systems for customers that buy them in relatively large quantities. End users may turn on the computing device and wait for the software package or customization software package to automatically configure the computing device with the proper packages. This is done without any further interaction with the machine. As a result, the use of the proximity tag may boost sales during specific marketing campaigns. For example, if a retailer is implementing the system described herein e.g. has the capability of having a proximity tag reader, software packages and product keys, he/she could propose to his/her customers to "program" anti-virus software package, for example, into a computing device at the sales point without having to go through installation processes and without using any other software media CD, DVD, network connection, etc. to do so.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of installing a software package, comprising:
   with a manager application associated with a Basic Input/Output System (BIOS), accessing a software package coupon on a proximity tag coupled to a computing device;
   with the manager application, accessing an address included in the software package coupon, and installing an operating system OS agent from a source specified by the address during an initial booting of the computing device and before booting an Operating System (OS);

with the manager application, configuring the OS to call the OS agent;

booting the OS, during which, before the OS is completely booted, a startup process runs the OS agent; and with the OS agent, downloading and installing the software package.

2. The method of claim 1, wherein the proximity tag further comprises a product key that provides authorization to download the software package, install the software package, or a combination thereof.

3. The method of claim 1, wherein accessing the address included in the software package coupon comprises initiating a coupon manager procedure with a proximity tag coupon manager PTCM within the BIOS by initiating a communication channel between the proximity tag and a processor associated with the computing device and reading the software package coupon on the proximity tag.

4. The method of claim 3, wherein the PTCM downloads the OS agent using a unified extensible firmware interface UEFI network stack.

5. The method of claim 1, wherein configuration of the OS comprises changing registry keys to call the OS agent upon booting of the OS.

6. The method of claim 1, wherein the address is a uniform resource locator, and wherein the OS agent is downloaded over a network using the uniform resource locator.

7. The method of claim 1, wherein the OS agent is retrieved from a memory device within the computing device, the OS agent retrieved from a portion of the memory device at the address.

8. The method of claim 1, further comprising coupling the proximity tag to packaging for the computing device.

9. The method of claim 1, further comprising installing the proximity tag within a housing of the computing device.

10. The method of claim 1, wherein the manager application is stored in a same memory as the BIOS, the method comprising executing the manager application when the BIOS is run.

11. A computing device, comprising:
a proximity tag; and
a proximity tag coupon manager PTCM;
wherein, prior to booting of an operating system OS on the computing device, the PTCM is to:
read a software package coupon stored on the proximity tag;
download an OS agent from an address to a source of the OS agent, the address included in the software package coupon;
install the OS agent on the computing device; and
cause the OS agent to be called during booting of the OS for installation of a software package on the computing device.

12. The computing device of claim 11, further comprising a storage device on which to store the OS, the OS agent, the software package, and a product key associated with the software package.

13. The computing device of claim 11, further comprising a network adapter to communicatively couple the computing device to a network such that the OS agent may access and download the software package from a remote repository for installation of the software package on the computing device.

14. The computing device of claim 11, wherein the software package is stored on a memory device of the computing device and wherein other software packages stored on the memory of the computing device, but not installed on the computing device, are then deleted from the memory device.

15. The computing device of claim 11, wherein the PTCM comprises an application specific integrated circuit.

16. The computing device of claim 11, wherein the PTCM resides in memory associated with a basic input/output system (BIOS) program code of the computing device.

* * * * *